United States Patent
Yu et al.

(10) Patent No.: US 12,353,884 B2
(45) Date of Patent: Jul. 8, 2025

(54) CROSS-LINKING METHOD AND APPARATUS, ELECTRONIC DEVICE AND STORAGE MEDIUM

(71) Applicants: VERISILICON MICROELECTRONICS (SHANGHAI) CO., LTD., Shanghai (CN); VERISILICON MICROELECTRONICS (CHENGDU) CO., LTD., Sichuan (CN); VERISILICON MICROELECTRONICS (NANJING) CO., LTD., Jiangsu (CN)

(72) Inventors: Tingting Yu, Shanghai (CN); Ke Zhang, Shanghai (CN); Shuxi Lin, Shanghai (CN)

(73) Assignees: VERISILICON MICROELECTRONICS (SHANGHAI) CO., LTD., Shanghai (CN); VERISILICON MICROELECTRONICS (CHENGDU) CO., LTD., Sichuan (CN); VERISILICON MICROELECTRONICS (NANJING) CO., LTD., Jiangsu (CN)

( * ) Notice: Subject to any disclaimer, the term of this patent is extended or adjusted under 35 U.S.C. 154(b) by 0 days.

(21) Appl. No.: 18/277,532

(22) PCT Filed: Aug. 17, 2022

(86) PCT No.: PCT/CN2022/113080
§ 371 (c)(1),
(2) Date: Aug. 16, 2023

(87) PCT Pub. No.: WO2024/036517
PCT Pub. Date: Feb. 22, 2024

(65) Prior Publication Data
US 2025/0021339 A1    Jan. 16, 2025

(51) Int. Cl.
*G06F 9/38* (2018.01)
*G06F 8/41* (2018.01)

(52) U.S. Cl.
CPC ............... *G06F 9/384* (2013.01); *G06F 8/41* (2013.01)

(58) Field of Classification Search
CPC ....................................... G06F 9/384
See application file for complete search history.

(56) References Cited

U.S. PATENT DOCUMENTS

| | | |
|---|---|---|
| 6,968,541 B1 | 11/2005 | Hanson et al. |
| 2005/0010911 A1 | 1/2005 | Kim et al. |

(Continued)

FOREIGN PATENT DOCUMENTS

| | | |
|---|---|---|
| CN | 1577268 A | 2/2005 |
| CN | 1892602 A | 1/2007 |

(Continued)

OTHER PUBLICATIONS

International Search Report (and English Translation) and Written Opinion with regard to PCT/CN2022/113080 dated Apr. 20, 2023.
English Abstract for CN1577268 retrieved on Espacenet on Aug. 16, 2023.

(Continued)

*Primary Examiner* — Michael J Metzger
(74) *Attorney, Agent, or Firm* — BCF LLP

(57) ABSTRACT

Provided are cross-linking method and apparatus, electronic device and storage medium. The method includes: modifying a register address in a first operation instruction of a library function after the register address in the first operation instruction hits a preset mapping table, wherein the mapping table includes a mapping relationship between a target register address of a main program and the register address of the library function, the target register address of the main program is increased to a first address bit number, the register address in the operation instruction of the library (Continued)

function has a second address bit number, the first address bit number is greater than the second address bit number, and the modified register address in the first operation instruction is the target register address of the corresponding main program in the mapping table; and migrating the modified first operation instruction into the main program.

19 Claims, 2 Drawing Sheets

(56) References Cited

U.S. PATENT DOCUMENTS

| | | | |
|---|---|---|---|
| 2013/0138922 A1* | 5/2013 | Eres | G06F 9/384 |
| | | | 712/228 |
| 2021/0279045 A1 | 9/2021 | Ko et al. | |

FOREIGN PATENT DOCUMENTS

| | | |
|---|---|---|
| CN | 112506517 A | 3/2021 |
| CN | 114816417 A | 7/2022 |

OTHER PUBLICATIONS

English Abstract for CN112506517 retrieved on Espacenet on Aug. 16, 2023.
English Abstract for CN1892602 retrieved on Espacenet on Aug. 16, 2023.
English Abstract for CN114816417 retrieved on Espacenet on Aug. 16, 2023.

* cited by examiner

CROSS-LINKING METHOD AND APPARATUS, ELECTRONIC DEVICE AND STORAGE MEDIUM

TECHNICAL FIELD

The present application relates to the field of computer technologies, and particularly to a cross-linking method and apparatus, an electronic device and a storage medium.

BACKGROUND ART

A compiling-linking process is a process of converting a high-level language program (source code) into a program (executable code or machine code) which may be run on hardware, and includes two main steps of compiling and linking. Compiling is a process of translating the high-level language source code into an intermediate code (object file); and linking is a process of organizing the object file and a used library file (including a library function) into the finally generated executable code.

For example, depending on a number of bits of an address, compilers may include a 64-bit compiler and a 32-bit compiler, and when the compilers support plural hardware platforms and plural programming languages, there may exist a complex situation where some programs are generated by a 32-bit front end and other programs are generated by a 64-bit front end. Specifically, when 64-bit executable programs are required to be generated and the library functions are generated by the 32-bit compilers, current linkers cannot realize correctness of the machine codes generated in such a case during cross-linking, such that a worker has to upgrade all the library functions to 64 bits, which requires that all the compilers generating the library functions have to be upgraded to 64 bits, thereby bringing a great amount of work to the worker. Thus, in the current compiling-linking process, cross-linking of programs with different numbers of bits cannot be realized without upgrading the library function.

SUMMARY

An object of embodiments of the present application is to provide a cross-linking method and apparatus, an electronic device, and a storage medium, so as to realize cross-linking of programs with different numbers of address bits.

The present application is implemented as follows.

In a first aspect, an embodiment of the present application provides a cross-linking method, including: modifying a register address in a first operation instruction of a library function after the register address in the first operation instruction hits a preset mapping table, wherein the mapping table includes a mapping relationship between a target register address of a main program and the register address of the library function, the target register address of the main program is increased to a first address bit number, the register address in the operation instruction of the library function has a second address bit number, the first address bit number is greater than the second address bit number, and the modified register address in the first operation instruction is the target register address of the corresponding main program in the mapping table; and migrating the modified first operation instruction into the main program.

In the embodiment of the present application, before the operation instruction of the library function is migrated to the main program, detection is performed according to the preset mapping table, and after the register address in the first operation instruction hits the preset mapping table, the register address in the first operation instruction is modified (that is, is increased to the first address bit number) according to the mapping relationship of the mapping table, and then, the modified first operation instruction is migrated to the main program, so as to guarantee correctness of the library function migrated to the main program and uniformity of the address bit number; such a manner also avoids that a worker upgrades all compilers generating library functions to the first address bit number, and thus reduces a workload of the worker, and accelerates a development process of a subsequent project.

In conjunction with the technical solution in the first aspect, in some possible implementations, before scanning all instructions in the library function, the method further includes: renaming registers corresponding to the library function, such that each registers in the library function are assigned values in one instruction.

In the embodiment of the present application, before all the instructions in the library function are scanned, the registers corresponding to the library function are renamed, such that each registers in the library function are assigned values in one instruction, and the renaming manner avoids that confusion is generated when bit numbers of the registers are increased subsequently, and thus affects normal migration of the library function.

In conjunction with the technical solution in the first aspect, in some possible implementations, before the modifying a register address in an address operation instruction of the library function after the address operation instruction of the library function hits the preset mapping table, the method further includes: scanning all instructions in the library function, and determining the first operation instruction, wherein the first operation instruction is an address operation instruction; and matching the register address in the first operation instruction with the mapping table.

In the embodiment of the present application, all the instructions of the library function are scanned first, and the action of matching with the mapping table is performed only when the instruction is an address operation instruction, thus improving a linking efficiency.

In conjunction with the technical solution in the first aspect, in some possible implementations, before the scanning all instructions in the library function, the method further includes: acquiring a parameter passing instruction of the main program, wherein the parameter passing instruction includes the target register address and a source register address, the target register address has a second address bit number, and the target register address is an address for providing input parameters for the called library function; increasing the target register address to the first address bit number, and associating the target register address with the register address of the called library function, wherein the register address of the called library function is an input parameter address of the called library function; and constructing the mapping table based on the target register address with the increased bit number and the register address of the called library function.

In the embodiment of the present application, the bit number of the parameter register address is modified based on the parameter passing instruction of the main program to dynamically form the required mapping table without constructing a mapping table containing mapping relationships of all register addresses, thus improving the linking efficiency.

In conjunction with the technical solution in the first aspect, in some possible implementations, before the acquiring a parameter passing instruction of the main program, the method further includes: compiling a main program source code with the first address bit number into the main program based on a compiler with the first address bit number; and compiling a library function source code with the second address bit number into the library function based on a compiler with the second address bit number.

In the embodiment of the present application, the main program source code may be continuously compiled based on the compiler with the first address bit number, and the library function source code may be continuously compiled based on the compiler with the second address bit number, such that the worker is not required to upgrade all the compilers generating the library functions to the first address bit number, thus reducing the workload of the worker, and accelerating the development process of the subsequent project.

In conjunction with the technical solution in the first aspect, in some possible implementations, when a register address hitting the mapping table and a register address not hitting the mapping table exist in the first operation instruction, the method further includes: increasing a target register of a main program corresponding to the register address not hitting the mapping table to the first address bit number by means of symbol expansion, and updating the mapping table; and modifying the register address in the first operation instruction based on the updated mapping table.

In the embodiment of the present application, when the register address hitting the mapping table and the register address not hitting the mapping table exist in the first operation instruction, the target register of the main program corresponding to the register address not hitting the mapping table is increased to the first address bit number by means of symbol expansion, and the mapping table is updated. In this way, the mapping table can be updated in a linking process of the library function, so as to guarantee the correctness of the library function migrated to the main program and the uniformity of the address bit number.

In conjunction with the technical solution in the first aspect, in some possible implementations, the first operation instruction includes any one of a loading instruction, a storing instruction, and an operation instruction.

In a second aspect, an embodiment of the present application provides a cross-linking apparatus, including: a processing module configured to modify a register address in a first operation instruction of a library function after the register address in the first operation instruction hits a preset mapping table, wherein the mapping table includes a mapping relationship between a target register address of a main program and the register address of the library function, the target register address of the main program is increased to a first address bit number, the register address in the operation instruction of the library function has a second address bit number, and the modified register address in the first operation instruction is the target register address of the corresponding main program in the mapping table; and a linking module configured to migrate the modified first operation instruction to the main program.

In conjunction with the technical solution in the second aspect, in some possible implementations, the apparatus further includes: a renaming module configured to, before scanning all instructions in the library function, rename registers corresponding to the library function, such that each register in the library function are assigned values in one instruction.

In conjunction with the technical solution in the second aspect, in some possible implementations, the apparatus further includes: a matching module configured to, before modifying a register address in an address operation instruction of the library function after the address operation instruction of the library function hits the preset mapping table, scan all instructions in the library function, and determine the first operation instruction, wherein the first operation instruction is an address operation instruction; and match the register address in the first operation instruction with the mapping table.

In conjunction with the technical solution in the second aspect, in some possible implementations, the apparatus further includes: a constructing module configured to, before scanning all the instructions in the library function, acquire a parameter passing instruction of the main program, wherein the parameter passing instruction includes the target register address and a source register address, the target register address has a second address bit number, and the target register address is an address for providing input parameters for the called library function; increase the target register address to the first address bit number, and associate the target register address with the register address of the called library function, wherein the register address of the called library function is an input parameter address of the called library function; and construct the mapping table based on the target register address with the increased bit number and the register address of the called library function.

In conjunction with the technical solution in the second aspect, in some possible implementations, the apparatus further includes: a compiling module configured to, before acquiring the parameter passing instruction of the main program, compile a main program source code with the first address bit number into the main program based on a compiler with the first address bit number; and compile a library function source code with the second address bit number into the library function based on a compiler with the second address bit number.

In conjunction with the technical solution in the second aspect, in some possible implementations, the apparatus further includes: an updating module configured to, when a register address hitting the mapping table and a register address not hitting the mapping table exist in the first operation instruction, increase a target register of a main program corresponding to the register address not hitting the mapping table to the first address bit number by means of symbol expansion, and update the mapping table; and modify the register address in the first operation instruction based on the updated mapping table.

In conjunction with the technical solution in the second aspect, in some possible implementations, the first operation instruction includes any one of a loading instruction, a storing instruction, and an operation instruction.

In a third aspect, an embodiment of the present application provides an electronic device, including: a processor and a memory, the processor being connected with the memory; wherein the memory is configured to store a program; the processor is configured to call the program stored in the memory to perform the above method according to the embodiment of the first aspect and/or the method provided in conjunction with some possible implementations of the embodiment of the above first aspect.

In a fourth aspect, an embodiment of the present application provides a computer-readable storage medium having a computer program stored thereon, the computer program, when executed by a processor, performing the above method according to the embodiment of the first aspect and/or the method provided in conjunction with some possible implementations of the embodiment of the above first aspect.

BRIEF DESCRIPTION OF DRAWINGS

To describe the technical solutions in the embodiments of the present application more clearly, the following briefly describes the accompanying drawings required in the embodiments of the present application. It should be understood that the following accompanying drawings show merely some embodiments of the present application and therefore should not be considered as limiting the scope, and a person of ordinary skill in the art may still derive other related drawings from these accompanying drawings without creative efforts.

REFERENCE NUMERALS

100—electronic device; 110—processor; 120—memory; 200—cross-linking apparatus; 210—processing module; 220—linking module.

DETAILED DESCRIPTION OF EMBODIMENTS

The technical solutions in the embodiments of the present application are described with reference to the accompanying drawings in the embodiments of the present application.

Figure 1:
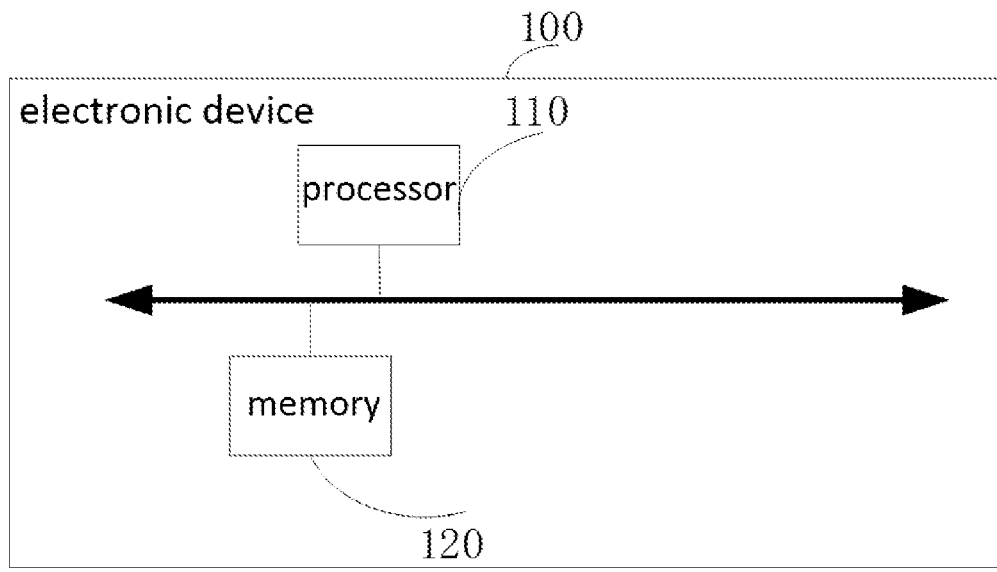
FIG. 1 is a module block diagram of an electronic device according to an embodiment of the present application.

Reference is made to FIG. 1 which is a schematic block diagram of an electronic device 100 to which a cross-linking method and apparatus are applied according to an embodiment of the present application. In the embodiment of the present application, the electronic device 100 may be a terminal or a server, and the terminal may be, but is not limited to, a personal computer (PC), a smart phone, a tablet computer, a personal digital assistant (PDA), a mobile Internet device (MID), or the like. The server may be, but is not limited to, a network server, a database server, a cloud server, a server cluster constituted of a plurality of sub-servers, or the like. Certainly, the above listed devices are only used to facilitate understanding of the embodiments of the present application, and should not be taken as limitation of the embodiments.

Structurally, the electronic device 100 may include a processor 110 and a memory 120.

The processor 110 and the memory 120 are electrically connected, directly or indirectly, to implement data transmission or interaction; for example, the elements may be electrically connected to each other via one or more communication buses or signal lines. The cross-linking apparatus includes at least one software module which may be stored in the memory 120 or solidified in an operating system (OS) of the electronic device 100 in a form of software or firmware. The processor 110 is configured to execute executable modules stored in the memory 120, such as software functional modules, a computer program, or the like, included in the cross-linking apparatus, so as to implement the cross-linking method. The processor 110 may execute the computer program after receiving an execution instruction.

In the embodiment of the present application, the processor 110 is a graphics processing unit (GPU). A compiler configured in the GPU supports both graphics rendering high-level languages, such as a GLSL (OpenGL Shading Language), an HLSL (High Level Shader Language), or the like, and general purpose computation high-level languages, such as an OpenCL (Open Computing Language), a CUDA (Compute Unified Device Architecture), or the like, and meanwhile supports binary-form intermediate code representation, such as DXIL, SPIR-V, or the like.

Certainly, the processor 110 may also be an integrated circuit chip having a signal processing capability. The processor 110 may also be a general-purpose processor, for example, a central processing unit (CPU), a digital signal processor (DSP), an application specific integrated circuit (ASIC), a discrete gate or transistor logic device, or a discrete hardware component, and may implement or execute the methods, steps, and logic blocks according to the embodiments of the present application. Further, the general-purpose processor may be a microprocessor, any conventional processor, or the like.

The memory 120 may be, but is not limited to, a random access memory (RAM), a read only memory (ROM), a programmable read-only memory (PROM), an erasable programmable read-only memory (EPROM), and an electric erasable programmable read-only memory (EEPROM). The memory 120 is configured to store the program, and the processor 110 executes the program after receiving the execution instruction.

It should be noted that the structure shown in FIG. 1 is only an illustration, and the electronic device 100 according to the embodiment of the present application may also have fewer or more components than those shown in FIG. 1, or have a different configuration than that shown in FIG. 1. Furthermore, each component shown in FIG. 1 may be implemented by software, hardware, or a combination thereof.

Figure 2:
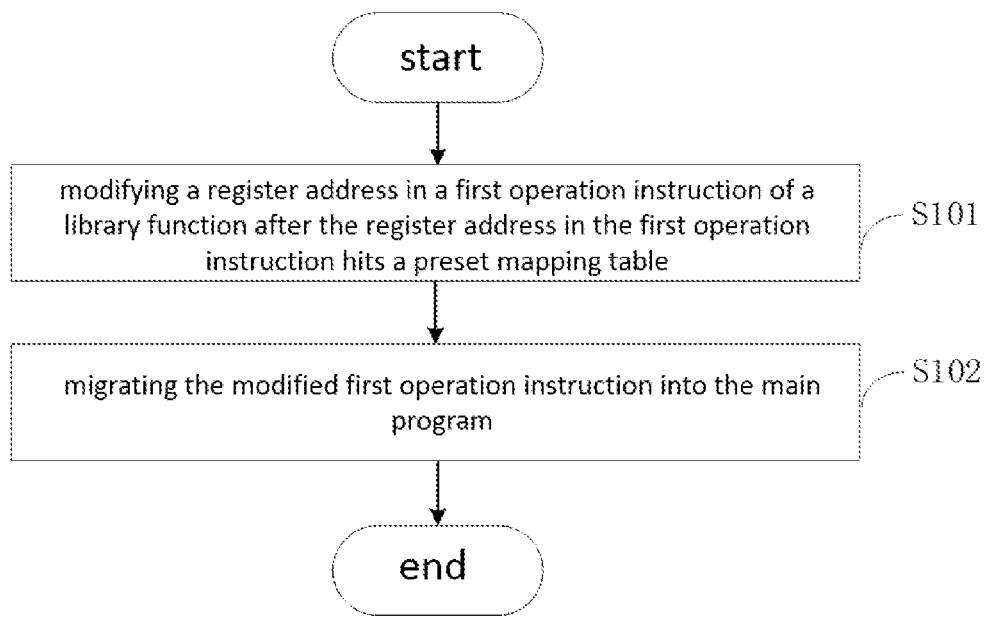
FIG. 2 is a flow chart illustrating steps of a cross-linking method according to an embodiment of the present application.

Reference is made to FIG. 2 which is a flow chart illustrating steps of the cross-linking method according to the embodiment of the present application, and the method is applied to the electronic device 100 shown in FIG. 1. It should be noted that the cross-linking method according to the embodiment of the present application is not limited by the sequence shown in FIG. 2 and the following sequence, and the method includes step S101 to step S102.

Step S101: modifying a register address in a first operation instruction of a library function after the register address in the first operation instruction hits a preset mapping table.

Herein, the mapping table includes a mapping relationship between a target register address of a main program and the register address of the library function, the target register address of the main program is increased to a first address bit number, the register address in the operation instruction of the library function has a second address bit number, and the modified register address in the first operation instruction is the target register address of the corresponding main program in the mapping table.

It should be noted that the first address bit number is greater than the second address bit number, the first address bit number is determined by a main program source code, and the second address bit number is determined by an address bit number of a library function source code. For example, if the main program source code has 64 bits, the first address bit number is 64, and if the address bit number of the library function source code is 32, the second address bit number is 32. Certainly, in other embodiments, the first address bit number may be 32, the second address bit number may be 16, or the first address bit number may be 128, and the second address bit number may be 64, or the first address bit number may be 64, and the second address bit number may be 16, which is not limited in the present application. For ease of understanding, in the following examples, as an example, the first address bit number is 64 and the second address bit number is 32.

The above hit may be understood to mean that the register address in the first operation instruction of the library function is the same as one of register addresses in the mapping table.

As an embodiment, before step S101, the method further includes: scanning all instructions in the library function, and determining the first operation instruction, wherein the first operation instruction is an address operation instruction; and matching the register address in the first operation instruction with the mapping table.

The first operation instruction includes any one of a loading instruction (load), a storing instruction (store), and an operation instruction.

The operation instruction includes, but is not limited to: an addition instruction (add), a subtraction instruction (sub), a multiplication instruction (mul), and a division instruction (div).

In the embodiment of the present application, all the instructions of the library function are scanned first, and the action of matching with the mapping table is performed only when the instruction is an address operation instruction, thus improving a linking efficiency.

Certainly, the first instruction may also refer to all the instructions in the library function, which is not limited in the present application.

Optionally, before the action of scanning all the instructions in the library function, the method further includes: renaming registers corresponding to the library function, such that each register in the library function are assigned values in one instruction.

Exemplarily:

001: uadd uint32 temp(1079), uint32 temp(1067), uint32 temp(1069);

. . .

007: uadd uint32 temp(1079), uint32 temp(1068), 10.

001 and 007 represent two addition instructions in a library function. Uint32 represents a 32-bit integer type, and temp (*) represents a register; for example, temp(1079) represents register No. 1079. In each of instruction 001 and instruction 007, a value is assigned to temp(1079); in order to avoid confusion during a subsequent bit number increase of the register, as in a case where the same register is required to be increased to 64 bits in some instructions and not required to be increased to 64 bits in other instructions (for example, non-address operation instructions), temp (1079) may be renamed an unused new register temp(1267), and the above instruction is changed to:

001: uadd uint32 temp(1079), uint32 temp(1067), uint32 temp(1069)

. . .

007: uadd uint32 temp(1267), uint32 temp(1068), 10

Thus, in the embodiment of the present application, before all the instructions in the library function are scanned, the registers corresponding to the library function are renamed, such that each register in the library function are assigned values in one instruction, and the renaming manner avoids the confusion during the subsequent bit number increases of the registers.

Optionally, before the action of scanning all the instructions in the library function, the method further includes: acquiring a parameter passing instruction of the main program; increasing the target register address in the parameter passing instruction to the first address bit number, and associating the target register address with the register address of the called library function; and constructing the mapping table based on the target register address with the increased bit number and the register address of the called library function.

The parameter passing instruction includes the target register address and a source register address.

The target register address originally has the second address bit number, and the target register address is an address for providing input parameters for the called library function; and the register address of the called library function is an address of input parameter of the called library function.

Exemplarily:

movparam uint32 temp(66) uint64 temp(34).

The above instruction is a parameter passing instruction of a main program; uint64 represents a 64-bit integer type. This instruction means that a value of register No. 34 is assigned to register No. 66. Temp (34) is a source register address, and an operand of temp(34) is a source operand. Temp (66) is a target register address; an operand of temp (66) is a target operand, and temp(66) is an address for providing input parameters for a called library function.

Since the main program has 64 bits, the target operation address of the instruction is modified here and increased to 64 bits, and the modified instruction is as follows:

movparam uint64 temp(66) uint64 temp(34).

Thus, the target register address temp(66) is increased from 32 bits to 64 bits.

Exemplarily, the register address of the called library function corresponding to the input parameter address is uint32 temp(1067). That is, uint32 temp(1067) is the register address of the called library function, and is also the input parameter address of the called library function.

Then, the target register address with the increased bit number is associated with the register address of the called library function to construct a mapping table.

A mapping relationship between the target register address with the increased bit number and the register address of the called library function in the mapping table is as follows:

uint32 temp(1067)↔uint64 temp(66).

It should be noted that, if the instruction in the main program is a non-address operation instruction, linking may be performed directly using a conventional linking method.

Thus, in the embodiment of the present application, the bit number of the parameter register address is modified based on the parameter passing instruction of the main program to dynamically form the required mapping table without constructing a mapping table containing mapping relationships of all register addresses, thus improving the linking efficiency.

Optionally, before the acquiring a parameter passing instruction of the main program, the method further includes: compiling a main program source code with the first address bit number into the main program based on a compiler with the first address bit number; and compiling a library function source code with the second address bit number into the library function based on a compiler with the second address bit number.

Exemplarily, a 64-bit main program source code may be compiled into the main program based on a 64-bit compiler; a 32-bit library function source code is compiled into the library function based on a 32-bit compiler.

It should be noted that both the main program and the library function in the foregoing embodiment are middle level intermediate codes. Before linking, the source code is required to be compiled by a compiler. In the embodiment of the present application, the main program source code may be continuously compiled based on the compiler with the first address bit number, and the library function source code may be continuously compiled based on the compiler with the second address bit number, such that a worker is not required to upgrade all compilers generating library functions to the first address bit number.

After the preset table is constructed and the first operation instruction of the library function is determined, the register address in the first operation instruction is matched with the mapping table. The following description is given with reference to a specific example, and the first operation instruction is a loading instruction as follows:

load float32 temp(1079), uint32 temp(1067), 0.

A mapping table is searched, in which uint32 temp(1067) is mapped to uint64 temp(66) of a main program, and a bit number of temp(66) of the main program is already increased to 64 bits, which indicates that when this operation instruction is migrated to the main program, a 64-bit increase for the instruction is required, the first operation instruction is modified here, and the modified first operation instruction is:

load float32 temp(1079), uint64 temp(66), 0.

In one embodiment, when a register address hitting the mapping table and a register address not hitting the mapping table exist in the first operation instruction, the method further includes: increasing a target register of a main program corresponding to the register address not hitting the mapping table to the first address bit number by means of symbol expansion, and updating the mapping table; and modifying the register address in the first operation instruction based on the updated mapping table.

Specifically, when a plurality of register addresses exist in the first operation instruction, there may exist a case where some register addresses hit the mapping table, and other register addresses do not hit the mapping table; in order to realize uniformity of the address bit number, only the target registers of the main program corresponding to the other register addresses are increased to the first address bit number, the mapping table is updated, and finally, the register address in the first operation instruction is modified based on the updated mapping table.

Since the symbol expansion method is well known in the art, the symbol expansion method is not repeated herein.

The following description is given with reference to a specific example, and the first operation instruction is an addition instruction as follows:

uadd uint32 temp(1079), uint32 temp(1067), uint32 temp (1069).

By looking up the mapping table, uint32 temp(1067) hits the mapping table and corresponds to uint64 temp(66) of the main program, and uint32 temp(1079) and uint32 temp(1069) do not hit the mapping table. Therefore, in order to unify the address bit number, the target registers of the main program corresponding to uint32 temp(1079) and uint32 temp(1069) are increased to 64 bits, and the mapping table is updated.

The updated mapping table includes the following mapping relationships:

uint32 temp(1067)↔uint64 temp(66);
uint32 temp(1079)↔uint64 temp(78);
uint32 temp(1069)↔uint64 temp(69).

Finally, the register address in the first operation instruction is modified based on the updated mapping table. The modified first operation instruction is as follows:

uadd uint64 temp(78), uint64 temp(66), uint64 temp(69).

Thus, in the embodiment of the present application, when the register address hitting the mapping table and the register address not hitting the mapping table exist in the first operation instruction, the target register of the main program corresponding to the register address not hitting the mapping table is increased to the first address bit number by means of symbol expansion, and the mapping table is updated. In this way, the mapping table can be updated in a linking process of the library function, so as to guarantee the correctness of the library function migrated to the main program and the uniformity of the address bit number.

In other embodiments, the bit number may also be increased according to a mapping relationship of symbols in a symbol table, which is not limited in the present application.

Step S102: migrating the modified first operation instruction into the main program.

Finally, the modified first operation instruction is migrated into the main program. Subsequent machine-independent optimization and machine-dependent optimization are performed on the linked main program to generate a final executable code, i.e., a machine code.

Figure 3:
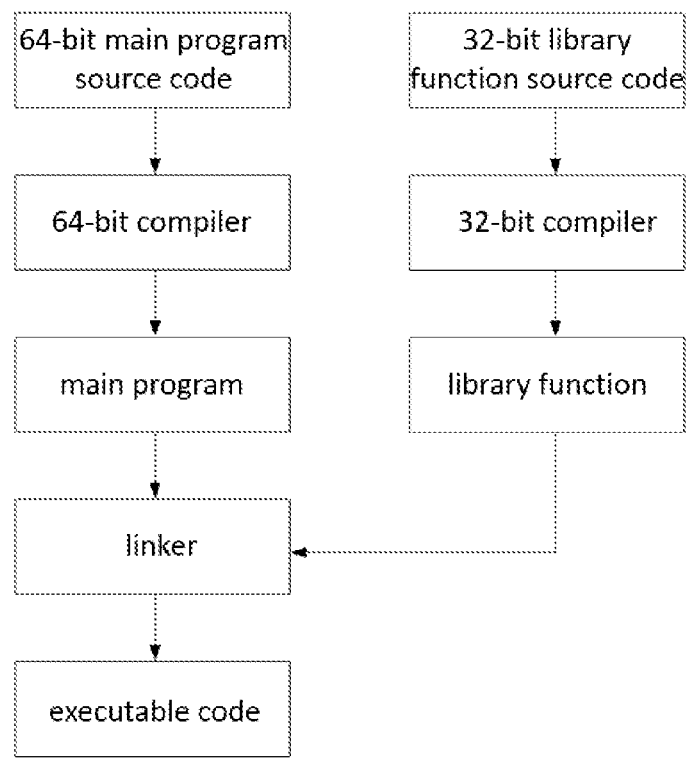
FIG. 3 is a schematic flow chart of cross-linking in an embodiment of the present application.

The cross-linking method is described below with reference to a specific example. Referring to FIG. 3, after obtaining a 64-bit main program source code and a 32-bit library function source code, the electronic device first performs compiling, that is, compiles the 64-bit main program source code into a main program by a 64-bit compiler, and compiles the 32-bit library function source code into a library function by a 32-bit compiler. Then, the main program and the library function are linked; first, a parameter passing instruction of the main program is acquired, the parameter passing instruction includes a target register address and a source register address, the target register address has 32 bits, and the target register address is an address for providing input parameters for the called library function; the target register address is increased to 64 bits, and associated with a register address of the called library function, and the register address of the called library function is an input parameter address of the called library function; and a mapping table is constructed based on the target register address with the increased bit number and the register address of the called library function. Then, registers corresponding to the library function are renamed, such that each register in the library function are assigned values in one instruction. Then, all instructions in the library function are scanned, and a first operation instruction is determined, and the first operation instruction is an address operation instruction; and a register address in the first operation instruction is matched with the mapping table. The register address in the first operation instruction of the library function is modified after the register address in the first operation instruction hits a preset mapping table, and the modified register address in the first operation instruction is the target register address of the corresponding main program in the mapping table; and finally, the modified first operation instruction is migrated into the main program, and then, an executable code is obtained.

In summary, in the embodiment of the present application, before the operation instruction of the library function is migrated to the main program, detection is performed according to the preset mapping table, and after the register address in the first operation instruction hits the preset mapping table, the register address in the first operation instruction is modified (that is, is increased to the first address bit number) according to the mapping relationship of the mapping table, and then, the modified first operation instruction is migrated to the main program, so as to guarantee correctness of the library function migrated to the main program and uniformity of the address bit number; such a manner also avoids that the worker upgrades all compilers generating library functions to the first address bit number, and thus reduces a workload of the worker, and accelerates a development process of a subsequent project.

Figure 4:
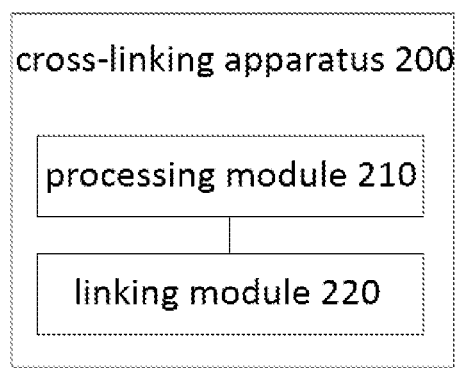
FIG. 4 is a module block diagram of a cross-linking apparatus according to an embodiment of the present application.

Referring to FIG. 4, based on the same inventive concept, an embodiment of the present application further provides a cross-linking apparatus 200, including:

- a processing module 210 configured to modify a register address in a first operation instruction of a library function after the register address in the first operation instruction hits a preset mapping table, wherein the mapping table includes a mapping relationship between a target register address of a main program and the register address of the library function, the target register address of the main program is increased to a first address bit number, the register address in the operation instruction of the library function has a second address bit number, the first address bit number is greater than the second address bit number, and the modified register address in the first operation instruction is the target register address of the corresponding main program in the mapping table; and
- a linking module 220 configured to migrate the modified first operation instruction into the main program.

Optionally, the apparatus further includes a matching module.

The matching module is configured to, before modifying a register address in an address operation instruction of the library function after the address operation instruction of the library function hits the preset mapping table, scan all instructions in the library function, and determine the first operation instruction, wherein the first operation instruction is an address operation instruction; and match the register address in the first operation instruction with the mapping table.

Optionally, the apparatus further includes a renaming module.

The renaming module is configured to, before scanning all instructions in the library function, rename registers corresponding to the library function, such that each register in the library function are assigned values in one instruction.

Optionally, the apparatus further includes a constructing module.

The constructing module is configured to, before scanning all the instructions in the library function, acquire a parameter passing instruction of the main program, wherein the parameter passing instruction includes the target register address and a source register address, the target register address has a second address bit number, and the target register address is an address for providing input parameters for the called library function; increase the target register address to the first address bit number, and associate the target register address with the register address of the called library function, wherein the register address of the called library function is an input parameter address of the called library function; and construct the mapping table based on the target register address with the increased bit number and the register address of the called library function.

Optionally, the apparatus further includes a compiling module.

The compiling module is configured to, before acquiring the parameter passing instruction of the main program, compile a main program source code with the first address bit number into the main program based on a compiler with the first address bit number; and compile a library function source code with the second address bit number into the library function based on a compiler with the second address bit number.

Optionally, the apparatus further includes an updating module.

The updating module is configured to, when a register address hitting the mapping table and a register address not hitting the mapping table exist in the first operation instruction, increase a target register of a main program corresponding to the register address not hitting the mapping table to the first address bit number by means of symbol expansion, and update the mapping table; and modify the register address in the first operation instruction based on the updated mapping table.

It should be noted that persons skilled in the art may clearly understand that, for the purpose of convenient and brief description, for a detailed working process of the foregoing system, apparatus, and unit, reference may be made to a corresponding process in the foregoing method embodiment, and details are not repeated herein.

Based on the same inventive concept, an embodiment of the present application further provides a computer-readable storage medium having a computer program stored thereon, the computer program, when executed, performing the method according to the above embodiment.

The storage medium may be any available medium which may be accessed by a computer or a data storage device, such as a server, a data center, or the like, including one or more integrated available media. The available medium may be a magnetic medium (for example, a floppy disk, a hard disk, magnetic tape), an optical medium (for example, DVD), or a semiconductor medium (for example, a solid state disk (SSD)), or the like.

In the embodiments provided in the present application, it should be understood that the disclosed apparatus and method may be implemented in other manners. The described apparatus embodiment is only exemplary. For example, the unit division is only logical function division and may be other division in actual implementation. For another example, a plurality of units or components may be combined or integrated into another system, or some features may be ignored or not performed. In addition, the displayed or discussed mutual couplings or direct couplings or communication connections may be implemented through some communication interfaces. The indirect couplings or communication connections between the apparatuses or units may be implemented in electronic, mechanical or other forms.

In addition, the units described as separate parts may or may not be physically separate, and parts displayed as units may or may not be physical units, may be located in one position, or may be distributed on a plurality of network units. A part or all of the units may be selected according to an actual need to achieve the objectives of the solutions in the embodiments.

Further, the respective functional modules in the embodiments of the present application can be integrated to form an independent part, or can exist independently in a form of single module, or can be integrated, in a form of two or more modules, to form an independent part.

Herein, relational terms, such as first, second, or the like, may be used solely to distinguish one entity or operation from another entity or operation without necessarily requiring or implying any actual such relationship or order between such entities or operations.

The above description is only embodiments of the present application and is not intended to limit the protection scope of the present application, and various modifications and changes may be made to the present application by those skilled in the art. Any modification, equivalent replacement, or improvement made within the spirit and principle of the present application shall be included in the protection scope of the present application.

What is claimed is:

1. A cross-linking method, comprising:
   modifying a register address in a first operation instruction of a library function after the register address in the first operation instruction hits a preset mapping table, wherein the mapping table comprises a mapping relationship between a target register address of a main program and a register address of the library function, the target register address of the main program is increased to a first address bit number, a register address in an operation instruction of the library function has a second address bit number, the first address bit number is greater than the second address bit number, and a modified register address in the first operation instruction is a target register address of a corresponding main program in the mapping table; and
   migrating a modified first operation instruction into the main program.

2. The method according to claim 1, before scanning all instructions in the library function, further comprising:
   renaming registers corresponding to the library function, such that each register in the library function are assigned values in one instruction.

3. The method according to claim 1, before modifying a register address in an address operation instruction of the library function after the address operation instruction of the library function hits the preset mapping table, further comprising:
   scanning all instructions in the library function, and determining the first operation instruction, wherein the first operation instruction is an address operation instruction; and
   matching a register address in the first operation instruction with the mapping table.

4. The method according to claim 3, before scanning all instructions in the library function, further comprising:
   acquiring a parameter passing instruction of the main program, wherein the parameter passing instruction comprises the target register address and a source register address, the target register address has a second address bit number, and the target register address is an address for providing input parameters for a called library function;
   increasing the target register address to the first address bit number, and associating the target register address with a register address of the called library function, wherein the register address of the called library function is an input parameter address of the called library function; and
   constructing the mapping table based on the target register address with an increased bit number and the register address of the called library function.

5. The method according to claim 4, before the acquiring a parameter passing instruction of the main program, further comprising:
   compiling a main program source code with the first address bit number into the main program based on a compiler with the first address bit number; and
   compiling a library function source code with the second address bit number into the library function based on a compiler with the second address bit number.

6. The method according to claim 1, when a register address hitting the mapping table and a register address not hitting the mapping table exist in the first operation instruction, further comprising:
   increasing a target register of a main program corresponding to the register address not hitting the mapping table to the first address bit number by symbol expansion, and updating the mapping table; and
   modifying a register address in the first operation instruction based on an updated mapping table.

7. The method according to claim 1, wherein the first operation instruction comprises any one of a loading instruction, a storing instruction, and an operation instruction.

8. The method according to claim 2, wherein the first operation instruction comprises any one of a loading instruction, a storing instruction, and an operation instruction.

9. The method according to claim 3, wherein the first operation instruction comprises any one of a loading instruction, a storing instruction, and an operation instruction.

10. A cross-linking apparatus, comprising:
    a processing module, configured to modify a register address in a first operation instruction of a library function after the register address in the first operation instruction hits a preset mapping table, wherein the mapping table comprises a mapping relationship between a target register address of a main program and the register address of the library function, the target register address of the main program is increased to a first address bit number, a register address in an operation instruction of the library function has a second address bit number, the first address bit number is greater than the second address bit number, and a modified register address in the first operation instruction is a target register address of a corresponding main program in the mapping table; and
    a linking module, configured to migrate a modified first operation instruction into the main program.

11. The apparatus according to claim 10, further comprising:
    a renaming module, configured to, before scanning all instructions in the library function, rename registers corresponding to the library function, such that each register in the library function are assigned values in one instruction.

12. The apparatus according to claim 10, further comprising:
    a matching module, configured to, before modifying a register address in an address operation instruction of the library function after the address operation instruction of the library function hits the preset mapping table, scan all instructions in the library function, and determine the first operation instruction, wherein the first operation instruction is an address operation instruction; and match a register address in the first operation instruction with the mapping table.

13. The apparatus according to claim 12, further comprising:

a constructing module, configured to, before scanning all instructions in the library function, acquire a parameter passing instruction of the main program, wherein the parameter passing instruction comprises the target register address and a source register address, the target register address has a second address bit number, and the target register address is an address for providing input parameters for a called library function; increase the target register address to the first address bit number, and associate the target register address with a register address of the called library function, wherein the register address of the called library function is an input parameter address of the called library function; and construct the mapping table based on the target register address with an increased bit number and the register address of the called library function.

14. The apparatus according to claim 13, further comprising:

a compiling module, configured to, before acquiring the parameter passing instruction of the main program, compile a main program source code with the first address bit number into the main program based on a compiler with the first address bit number; and compile a library function source code with the second address bit number into the library function based on a compiler with the second address bit number.

15. The apparatus according to claim 10, further comprising:

an updating module, configured to, when a register address hitting the mapping table and a register address not hitting the mapping table exist in the first operation instruction, increase a target register of a main program corresponding to the register address not hitting the mapping table to the first address bit number by symbol expansion, and update the mapping table; and modify the register address in the first operation instruction based on an updated mapping table.

16. The apparatus according to claim 10, wherein the first operation instruction comprises any one of a loading instruction, a storing instruction, and an operation instruction.

17. The apparatus according to claim 11, wherein the first operation instruction comprises any one of a loading instruction, a storing instruction, and an operation instruction.

18. The apparatus according to claim 12, wherein the first operation instruction comprises any one of a loading instruction, a storing instruction, and an operation instruction.

19. An electronic device, comprising: a processor and a memory, the processor being connected with the memory;

wherein the memory is configured to store a program;

the processor is configured to execute the program stored in the memory to perform the method according to claim 1.

* * * * *